United States Patent
Kogut (10) Patent No.: US 7,411,949 B2
(45) Date of Patent: Aug. 12, 2008

(54) SYSTEM, METHOD AND APPARATUS FOR PREPARING A TABLE FOR A CELL SCHEDULER

(76) Inventor: Jaroslaw Kogut, ul. Balcerskiego 8/6, Gdansk, Poland 80-299 (PL)

( * ) Notice: Subject to any disclaimer, the term of this patent is extended or adjusted under 35 U.S.C. 154(b) by 1015 days.

(21) Appl. No.: 10/750,366

(22) Filed: Dec. 31, 2003

(65) Prior Publication Data

US 2005/0141514 A1 Jun. 30, 2005

(51) Int. Cl.
*H04L 12/50* (2006.01)
*H04L 12/28* (2006.01)
*G06F 9/26* (2006.01)

(52) U.S. Cl. .................. 370/382; 370/395.7; 711/200

(58) Field of Classification Search ............. 370/395.4, 370/395.7, 395.71, 400, 401, 382; 711/200–210
See application file for complete search history.

(56) References Cited

U.S. PATENT DOCUMENTS

| | | | | |
|---|---|---|---|---|
| 5,748,630 A | * | 5/1998 | Bergantino et al. | ......... 370/412 |
| 5,822,316 A | * | 10/1998 | Unekawa | ..................... 370/389 |
| 5,905,725 A | * | 5/1999 | Sindhu et al. | ................ 370/389 |
| 6,034,960 A | * | 3/2000 | Beshai et al. | ............. 370/395.4 |
| 6,212,179 B1 | * | 4/2001 | Murphy et al. | .............. 370/370 |
| 6,301,226 B1 | * | 10/2001 | Lincoln | ...................... 370/229 |
| 6,560,196 B1 | * | 5/2003 | Wei | ......................... 370/230.1 |
| 6,785,738 B1 | * | 8/2004 | Ivaturi | ........................ 709/245 |
| 6,980,649 B1 | * | 12/2005 | Batcher | ........................ 380/42 |
| 7,031,315 B2 | * | 4/2006 | Tanaka | ....................... 370/394 |

* cited by examiner

*Primary Examiner*—Hong Sol Cho
(74) *Attorney, Agent, or Firm*—Buckley, Maschoff & Talwalkar LLC (57) ABSTRACT

Methods, apparatuses and systems for populating a data structure. The data structure may be established in a memory unit and may have a total number of N slots for entries. In this case, N is defined as an integer representing the total number of slots in the data structure, and N is further expressible as a power of two with an integer exponent x. Entries may then be stored into L slots of the data structure, with L being defined as an integer representing a number of slots that contain entries. To produce an index value, x bits of a binary representation of L may be swapped. A new data entry is then stored into an entry of the data structure represented by the index value.

24 Claims, 5 Drawing Sheets

SYSTEM, METHOD AND APPARATUS FOR PREPARING A TABLE FOR A CELL SCHEDULER

BACKGROUND

Asynchronous Transfer Mode (ATM) includes a protocol for transmitting information over a network such as the Internet. ATM currently includes numerous standards that are publicly available. In ATM the flow of information, which may be referred to as traffic, may be specified as a number of cells transmitted per second. Cells are currently 53 byte sets of data that may be transmitted over an ATM link. Moreover, currently five of those 53 cell bytes are utilized to carry header information and the remaining 48 cell bytes are used to carry payload information that is being transmitted.

Modern networks may carry a variety of traffic, some of which may have strict timing requirements. With network protocols such as the ATM protocol, data traffic, including voice and video traffic, traverses a network via network devices such as ATM switches that assure that the appropriate connections are established, that the data reaches its destination via its designated connections, that bandwidth constraints are not exceeded and that timing requirements are met. Traffic flow through these network devices is often managed by a cell scheduler. In an ATM device such as an ATM switch, schedulers are used to manage the timing of cell transmission. Traffic with rigid timing requirements, such as real-time voice and video traffic must be accommodated in those schedulers along with other data traffic. The ATM protocol addresses those timing issues by designating special classes or categories of service for handling time sensitive data. ATM traffic thus generally has a quality of service (Qos) guarantee that varies depending on the specific requirements of the traffic type. Two classes of service that maintain end-to-end timing relationships across an ATM network are the constant bit rate (CBR) class of service and the variable bit rate real-time (VBR-rt) class of service, which are described in the ATM standards.

ATM cell schedulers generally include tables having slots that are populated according to the requirements of the traffic being scheduled such as CBR and VBR-rt along with other types of traffic having less demanding timing requirements. Thus, each cell to be transmitted may be identified in a slot of the table and the identified cells may be transmitted in the order in which they are identified in the table.

ATM traffic can enter and exit a network device such as a switch via one or more ports, with each port carrying a sub-stream of traffic. Certain of those sub-streams may furthermore be constant-bandwidth sub-streams and carry real-time traffic. Constant bandwidth sib-streams also adhere to timing requirements to assure constant bandwidth. To maintain proper timing in a scheduler table that sequentially runs through all slots in the table to find the next ATM cell to transmit, the distance between all consecutive table entries of a sub-stream of such real-time data should be equal. That distance between entries related to a sub-stream may be referred to as a step, may be measured in terms of a number of slots between entries for that sub-stream in the table, with each consecutive entry for a particular sub-stream of real-time data being a step apart, and may be referred to as Z.

When populating such a table with information from numerous sub-streams in accordance with timing requirements, the proper slots must be available and identified for population. Checking for slot availability generally becomes more laborious as more entries are made in the table and the table becomes more densely populated.

BRIEF DESCRIPTION OF THE DRAWINGS

The accompanying drawings, wherein like reference numerals are employed to designate like components, are included to provide a further understanding of the preparation of a table for a cell scheduler, are incorporated in and constitute a part of this specification, and illustrate embodiments of the preparation of a table for a cell scheduler that together with the description serve to explain the principles thereof.

In the drawings.

DETAILED DESCRIPTION

Systems, apparatuses, and methods for preparing a table for a cell scheduler are provided. Those cells may carry information and that information may, furthermore, comprise any data capable of being represented as a signal, such as an electrical signal, optical signal, acoustical signal and so forth. Examples of information in this context may include voice communications, images, video, text, data and so forth, with real-time voice communications and video and audio transmitted during, for example, a multi-media conference being examples of information carried in real-time sub-streams. Details, features, and advantages of the preparation of a table for a cell scheduler by employing a swap will become further apparent in the following detailed description of embodiments thereof.

Any reference in the specification to "one embodiment," "a certain embodiment," or a similar reference to an embodiment is intended to indicate that a particular feature, structure or characteristic described in connection with the embodiment is included in at least one embodiment of the preparation of a table for a cell scheduler. The appearances of such terms in various places in the specification are not necessarily all referring to the same embodiment. References to "or" are furthermore intended as inclusive so "or" may indicate one or another of the ored terms or more than one ored term.

In a certain embodiment of a scheduler table, during configuration of the table by populating the table with entries, for each potential entry in the scheduler table for the sub-stream, a check is performed to determine whether there is an unused slot in the table at the appropriate step from the last entry for that sub-stream. The slot in the table may alternately be referred to as a cell transmission slot. If there is a slot conflict because another cell is indicated at that slot, the slot may be incremented and another search performed for an available slot at that location. As the table becomes more populated with entries, that slot selection process may become require a great deal of processing time and effort to find an appropriate open slot. Populating a table through use of a swap operation may eliminate the iterative search of that embodiment.

Figure 1:
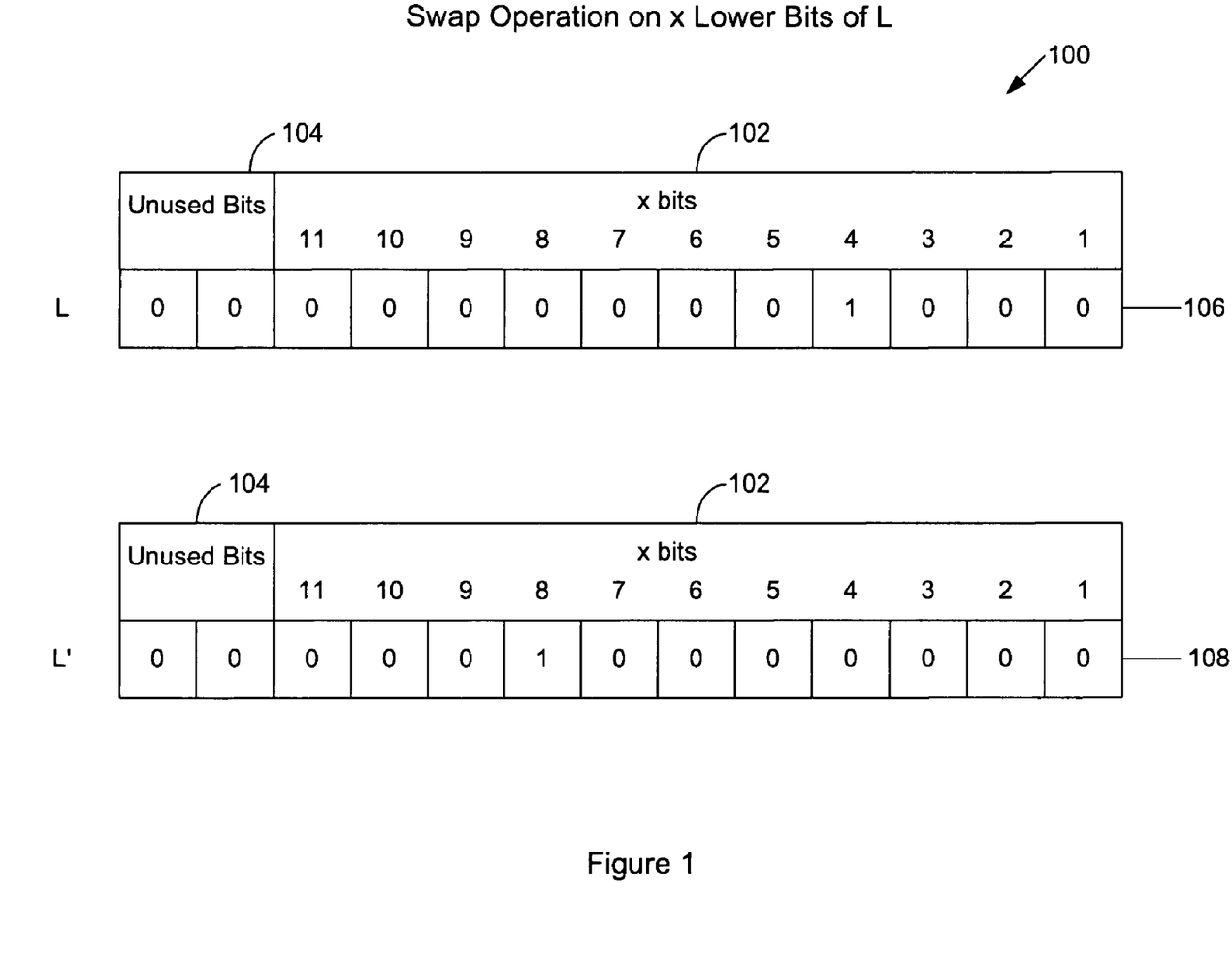
FIG. 1 illustrates an example of a swap operation on the bits of a binary representation.

FIG. 1 illustrates a swap operation 100 as used to index an entry for a table. In a scheduler for a network device that carries real-time data, one or more data structures such as tables may be configured such that entries into the tables corresponding to the real-time data are read according to precise timing parameters that assure proper delivery of the data. For example, cells may be identified in slots of the table and those cells may be transmitted from the network device to a next appropriate device on the network in the order the cells are identified in the table. Populating those tables can be performed quickly and efficiently by applying a swap operation that recognizes a relationship between the entries already inserted in the table and the next available slot in the table. The swap operation relies on the swapping of the values in the lower portion of a binary representation of the number of entries already in a table being populated to arrive at an index for a new entry into the table. Configuring a table through application of the swap operation assures that proper spacing relationships are maintained to meet timing requirements of constant bandwidth traffic, and that all available slots in a table are filled, without having to worry about slot conflict, provided the number of entries of an additional sub-stream to be entered will not exceed the remaining entry capacity of the table. Time and effort is saved by using the swap operation because, by its use, it becomes unnecessary to verify that slots are available each time a new sub-stream is introduced. For example, ATM schedulers that are designed in conformance with, for example, the ATM Forum specification for traffic management TM4.1 may thus use this swap operation in populating scheduler tables. The ATM Forum specification for traffic management TM4.1 may be found in the ATM standards.

The swap operation 100 is applied to a population of data structures and in particular to cell scheduling tables in schedulers for ATM cells in the example provided herein. Those of ordinary skill in the art will appreciate, however, that the swap operation described in connection with scheduler table population may be applicable to other systems, methods or apparatus having timing, spacing, or entry requirements comparable to those of scheduler tables.

In FIG. 1, 13 bits are available for use to express a binary number L representing the number of entries actually residing in a table having N total slots available for entries. N may be expressible as a power of two where N=two to the x power. The swap operation 100 illustrates the swapping of x lower bits of a binary representation of L. In the swap operation 100 illustrated in FIG. 1, the total slots for entries in the table, N, is 2048 such that the exponent value x therefore equals 11 ($2^{11}$=2048). The value of x (11 in FIG. 1) thus provides the number of lower bits of the binary representation of L 106 that are to be swapped. Accordingly, FIG. 1 shows the lower 11 bits 102 of binary L, which represents the number of entries already in the table, being swapped. Additional bits 104 are not swapped in this example.

In the swap operation 100 illustrated in FIG. 1, counting is performed with zero indicating a zero value and 1 indicating a non-zero value. The x lower bits of the binary representations of L, here the 11 lower bits, are the bit positions for 2 to the 0 power through 2 to the 10th power respectively from the rightmost bit. L, in the example illustrated in FIG. 1, is therefore equal to eight as expressed in a binary representation of L 106.

To perform the swap, the x bits of the binary representation of L are exchanged around an axis located at a center at a middle bit of the x bits of the binary representation of L when x is an odd number or at a center between two middle bits of the x bits of the binary representation of L when x is an even number. Thus, where x is an odd number, the middle bit is a bit of the x bits wherein there is an equal number of the remaining x bits on either side of the middle bit. Where x is an even number the center between two middle bits is a position wherein an equal number of the x bits lie on either side.

The center bit is thus a bit occupying a position in the binary representation of L at an x divided by two power where an odd number of bits are included in x and the two center bits are a bit occupying a position in the binary representation of L at an x divided by two rounded down power and a bit occupying a position in the binary representation of L at an x divided by two rounded up power where an even number of bits are included in x.

Accordingly, in the example of FIG. 1, the center bit is bit six and there are five bits on each side of bit six. Thus, the bit value in the zero power position, the first bit position, is swapped with the bit value in the tenth power position, the eleventh bit position. The bit value in the first power position, the second bit position, is swapped with the bit value in the ninth power position, the tenth bit position. The bit value in the third position is swapped with the bit value in the ninth position, the bit value in the fourth position is swapped with the bit value in the eighth position, the bit value in the fifth position is swapped with the bit value in the seventh position, and the bit value in the sixth position is left unchanged because the sixth position lies on the axis.

In the example illustrated in FIG. 1, the fourth bit position is the only position of the x bit positions being swapped that has a value of one. Thus, in a post-swap arrangement of L, referred to herein as L' 108, the only bit position of the x, or 11, bits being swapped that has a value of one is the bit in the eighth position, which is the seventh power position. After the swap operation, the resultant binary value of L' is 128.

That L' value may then be used as an index for a new entry into the table. For a sub-stream with a constant bandwidth, the step Z, i.e., the interval between consecutive slots for consecutive components of the same sub-stream in the table may then be calculated to obtain the indices for the remaining components of the sub-stream to schedule that sub-stream. A successive integer multiple of the step, starting with a multiple of one, may be added to the first index value to locate a slot for each successive component, respectively.

The step Z may be calculated by dividing the total number of slots in the table N by the number of components, K, of the sub-stream to be entered. For example, using the values in FIG. 1 to populate a scheduler table such as those used in an ATM device such as a switch, adding a sub-stream with four components, K, to a table with eight existing entries, L, would result in a first index value of L'=128. The step Z would be N divided by K or 2048/4=512, so the index for the second component would be L'+Z or 640, the index for the third component would be L'+2Z or 1152, and the index for the fourth component would be L'+3Z or 1664. The general formula for deriving the indices of a sub-stream with K components is thus L'+wZ, where w={0,1, . . . , K-2, K-1}. The value of w is therefore progressively increased by incrementing its value and that value of w is multiplied by the step Z to determine an index of a slot in the table in which each successive component of a sub-stream is to be entered, respectively.

Figure 2:
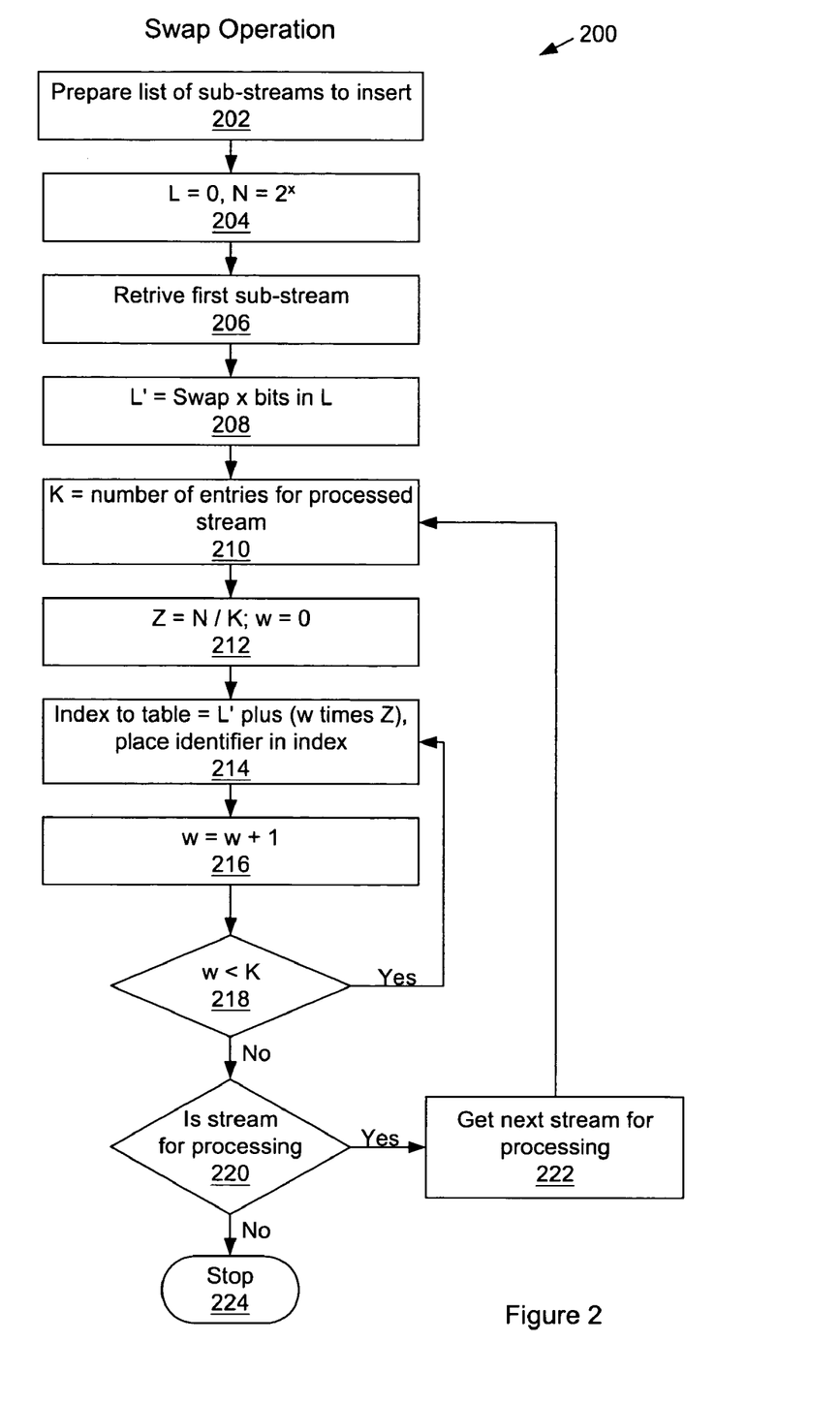
FIG. 2 illustrates an embodiment of a method of performing a swap operation to configure a data structure being populated with at least one sub-stream of constant bandwidth.

FIG. 2 illustrates an embodiment of a swap operation 200 used to configure a data structure being populated with at least one sub-stream of constant bandwidth such as real-time data. In tables such as those in ATM schedulers, the tables may be populated with data from various sub-streams of constant bandwidth that arrive from various sources. The maximum number of possible entries in a table, N, is again a value expressible as a power of two where N equals two to the x power and x is a natural number. The components, K, of a sub-stream are the units of bandwidth that make up the sub-stream. K is also expressible as a power of two in the swap operation 200, e.g., K equals two to the y power where y is a natural number.

In ATM traffic the units of bandwidth in a sub-stream may, for example, be cells or may correspond to ATM cells. In an ATM scheduler table the sub-stream my furthermore be traffic on a particular port transmitting at a constant bit rate. That traffic may, moreover, include real time traffic such as voice or video traffic.

In an embodiment of the swap operation 200, a value is obtained from the swap operation 200 that provides an index for one or more component entries into corresponding slots in a table. The table utilized in this example may be, for example, a configuration table such as a port shaper table that assures timely transmission of ATM cells in a scheduler of an ATM switch or other device.

Port shaper tables are generally configured such that ports with constant bandwidth requirements are allocated proper entries in a table. In a port shaper table, the slots may correspond to units of bandwidth associated with sub-streams of traffic, the sub-streams being from particular ports on a network device such as an ATM switch, and the traffic coming from a particular port having a constant bandwidth. When utilizing a port shaper table, the number of components, K, would generally be the number of units of bandwidth in a sub-stream, and in an ATM sub-stream would generally correspond to the number of cells in the sub-stream. Alternately, K could represent a transmission rate associated with a sub-stream, such as a port with a constant bandwidth and N could represent the maximum number of slots processed per unit of time. For example a configuration table could be used to process 2048 ATM cells per second (N=2048), and a port could have an associated rate of 64 cells per second.

An entry that may be placed into the configuration table could include an identifier used to identify a cell for transmission. The identifier may serve as a pointer to a component of a sub-stream, such as an ATM cell, in another table, such as a cell transmit table. In that way, as a processor loops through a port shaper table, entries that point to a cell for transmission are processed in accordance with timing requirements. Entries into a configuration table could alternately be actual cells, or units of bandwidth that correspond to one or more cells. The tables may be stored in a memory device such as a static random access memory (SRAM) device, another RAM device, a cache or any other desired memory device.

The swap operation 200 may be implemented in hardware or in software executed by a scheduler or other device. The software may furthermore be stored in an article of manufacture including a computer readable medium which, when executed, causes a processor to derive index values in accordance with the swap operation 200 as described herein. The software may also include instructions for populating the slots in the table.

Figure 3:
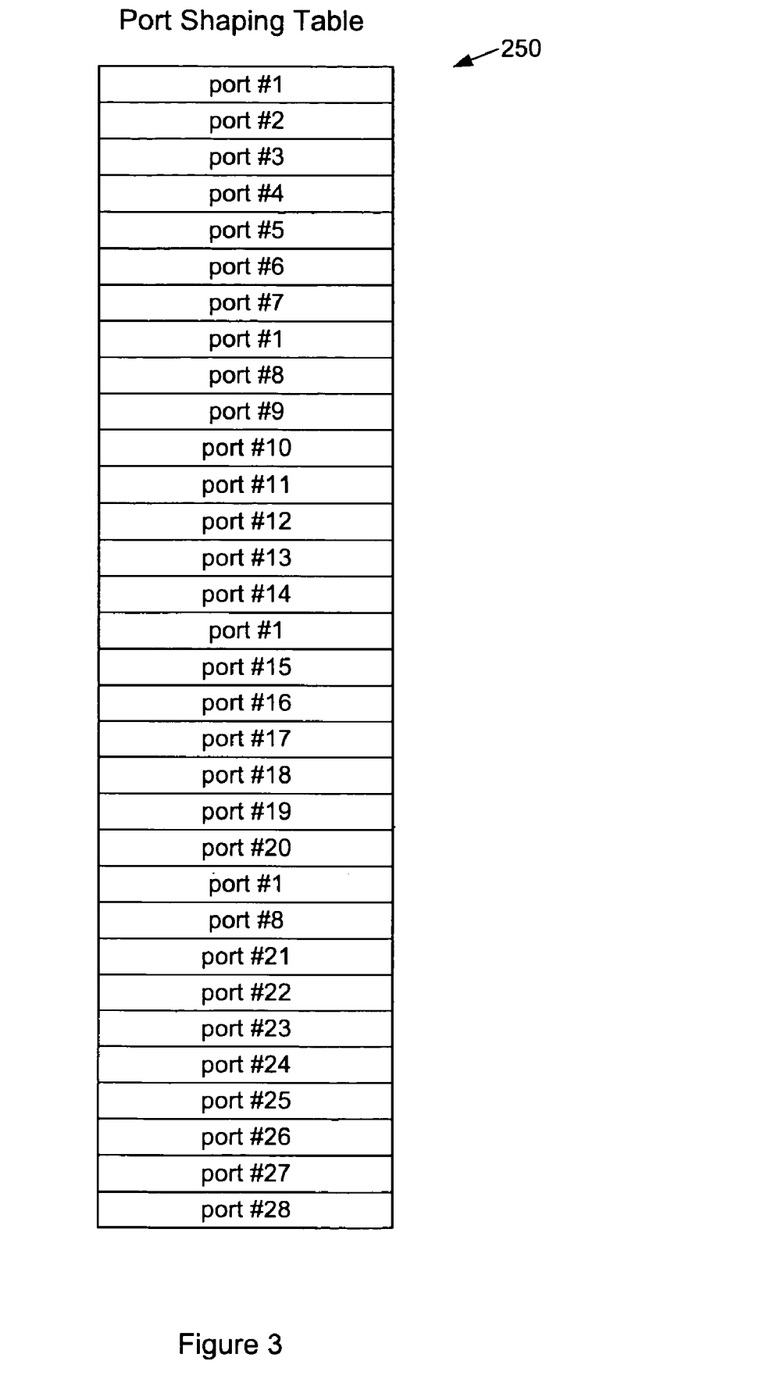
FIG. 3 illustrates an embodiment of a port shaping table.

The table on which the swap operation 200 is performed may be a port shaping table 250, such as shown in FIG. 3, that maintains a schedule of traffic from various ports depending on their configured line rates. Each port may have a specific constant bandwidth requirement. An entry in a port shaping table is generally associated with a unit of bandwidth that is associated with a particular port. The port shaping table would have N maximum entries that it processes cyclically. For example if N=2048 the entries could be processed in order from 1 through 2048, and then the process could loop back to the first entry and start over where the step Z between all units of bandwidth from a particular port are the same.

The swap operation 200 of FIG. 2 illustrates the use of the swap operation 200 in populating a configuration table. At 202 a list of sub-streams is prepared for insertion into the configuration table. The sub-streams may be sorted in decreasing order by size, with the sub-stream with the largest number of components going first to efficiently populate the configuration table. At 204, L represents the number of entries already inserted into the configuration table, having a total number of slots N, where N equals two to an x power and L is assigned the value zero before any entries are inserted. At 206 the first sub-stream for insertion is retrieved. At 208 the lower x bits of the binary representation of L are swapped to obtain L'. At 210 the number of components, K, of the sub-stream is obtained. K should also be expressible as a power of two where K equals two to the y power and K may be adjusted upwardly to arrive at such a value. At 212 the step for the sub-stream Z is calculated by dividing N by K and a counter w is initialized to zero. It should be noted that Z is also expressible as two to the x-y power.

At 214 to 218, an indexing loop may be repeated for each component of the sub-stream so that every component has an associated index for an entry into a slot in the table. Thus, at 214 an index value is determined by adding L' to w times Z. At 216 w is incremented by 1 and at 218 if w is less than K then the indexing at 214 and incrementing at 216 are repeated for the new value of w.

At 214 the components may also be identified in accordance with their respective index values. For example, an identifier may be entered into the table at the proper slot in accordance with the index value to serve as a pointer to the associated sub-stream component, such as an ATM cell or a unit of bandwidth from a particular port of on an ATM switch. Once all components are indexed for a sub-stream, a check is made at 220 to determine whether another sub-stream is available for processing. If another sub-stream is available, then the new sub-stream is accessed at 222 and the swap operation 200 returns to 210 to assign slots to the components of that other sub-stream. If no additional sub-streams are available for processing, then the swap operation 200 may stop at 224. It should be noted that the swap operation 200 may be repeated as desired to process all sub-streams.

FIG. 3 shows a port shaper table 250 that has been populated in accordance with the swap operation. 28 ports have been allocated slots of bandwidth in the table 250. Each entry in the table corresponds to a unit of bandwidth and includes the port number to which it is allocated. In the port shaper table 250, port number 1 receives four slots, or 4/32 of the total available bandwidth of the port shaper table 250. Port number 8 receives two slots, or 2/32 of the total bandwidth. Each of the other ports receives one slot or 1/32 of the bandwidth. All ports have a constant bandwidth requirement associated with them, and no port occupies a slot designated for another port. In this case the constant bandwidth requirement of port number 1 is twice as much as that of port 8 and four times greater than the other ports.

Figure 4:
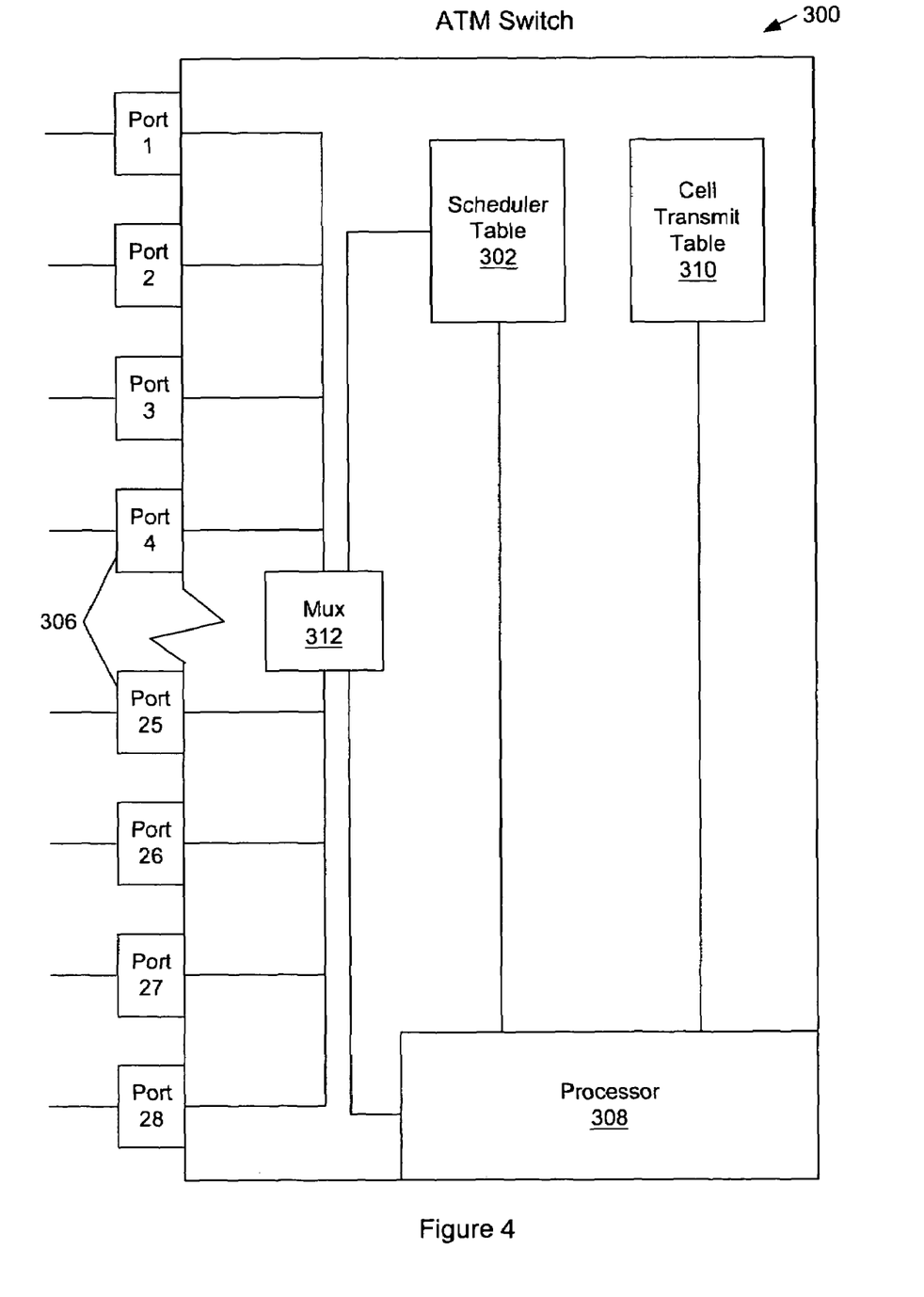
FIG. 4 illustrates an embodiment of a swap operation as used in a network device to populate a table in a scheduler.

FIG. 4 shows an embodiment of an ATM switch 300 in which an embodiment of the swap operation may be used to populate a table 302 in a scheduler 304. The ATM switch illustrated includes 28 ports 306 through which streams may be received from nodes coupled to those ports 306 and multiplexed through a multiplexer 312. Those ports 306 each have an associated constant bandwidth. A processor 308 will allocate slots in the table 302 to each of the 28 ports in accordance with the swap operation described in connection with FIGS. 1 and 2. Once the table 302 is populated it may, for example, look like the table 250 in FIG. 3. The slots of the table 302 may be populated with identifiers that point to corresponding entries in a cell transmit table 310. The processor may then cycle through the table 302 and signal the cell transmit table 310 to transmit cells in the order of the entries in the table 302. The timing requirements of cell transmission are met by virtue of the placement of the entries into the table 302 in accordance with the swap operation while assuring that entries are made in the table without having to verify slot availability. In the example illustrated in FIG. 3, the table 302 may be a port shaper table.

The processor 308 may execute the program instructions and process the data stored in memory coupled to the processor. In one embodiment, the instructions are stored in memory in a compressed and/or encrypted format. As used herein the phrase, "executed by a processor" is intended to encompass instructions stored in a compressed and/or encrypted format, as well as instructions that may be compiled or installed by an installer before being executed by the processor 308.

Figure 5:
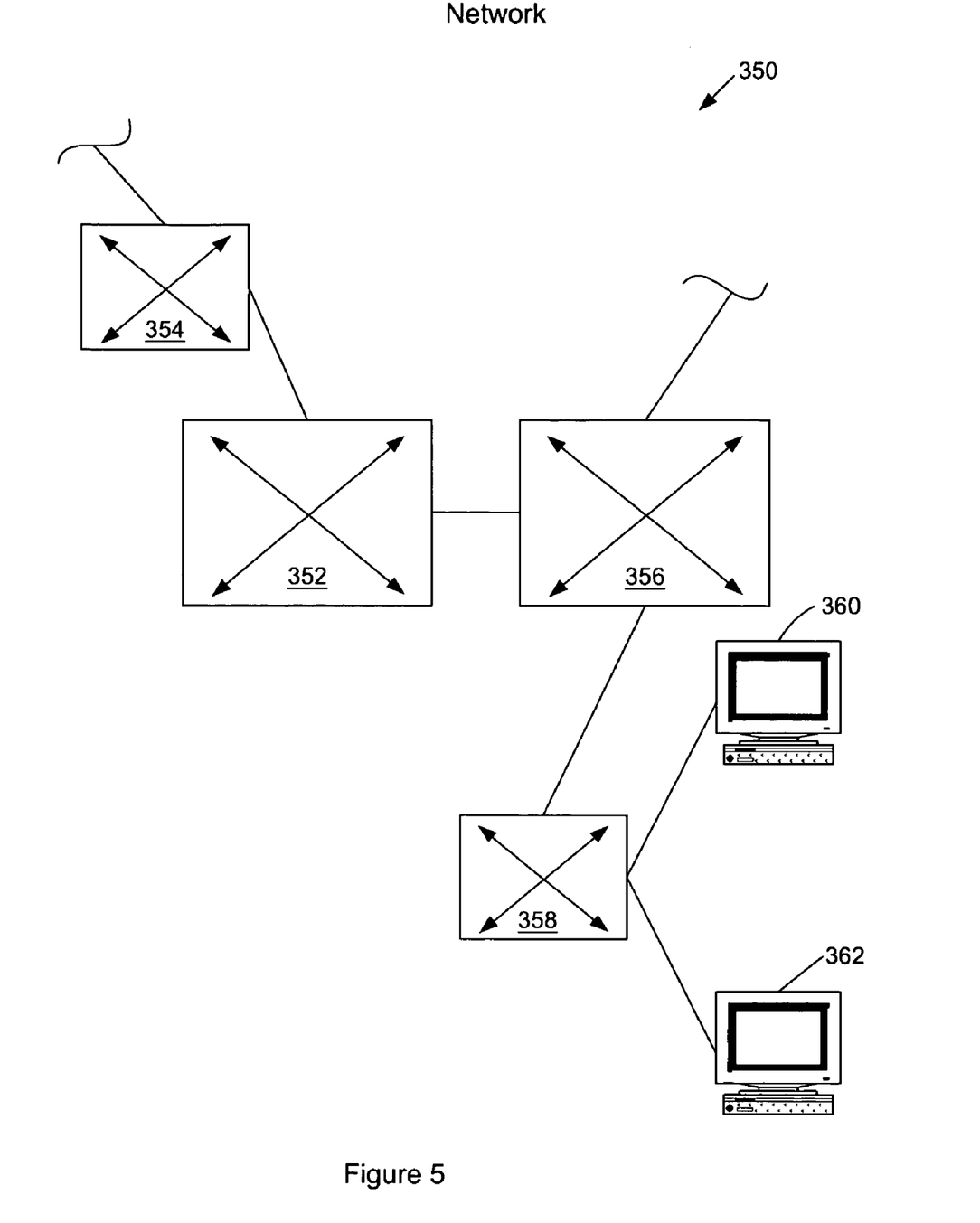
FIG. 5 illustrates an embodiment of a network in which a swap operation may be employed.

FIG. 5 shows an embodiment of a network 350 in which an embodiment of the swap operation may be employed. The network 350 includes a first ATM switch 352 coupled to a LAN (local area network) switch 354 and a second ATM switch 356 by, for example, ports such as the ports 306 illustrated in the ATM switch 300 of FIG. 4. The first ATM switch 352 may, for example, be coupled to the second ATM switch 356 by way of an ATM backbone and may receive cells from the LAN switch 354 and transmit those cells to the second ATM switch 356. Thus, the first ATM switch 352 may perform the swap described herein to prepare a table for a cell scheduler to transmit cells received from the LAN switch 354 to the second ATM switch 356. Alternately, the first ATM switch 352 may receive cells from the second ATM switch 356 and transmit those cells to the LAN switch 354 in accordance with the swapping opeation and table preparation described herein.

The second ATM switch 356 is also coupled to a workgroup ATM switch 358 and may operate on cells received from or transmitted to the workgroup ATM switch 358 utilizing the swapping operation and table preparation described herein. Two workstations 360 and 362 are also coupled to the workgroup ATM switch 358 such that cells transmitted from either of those workstations 360 and 362 to the workgroup ATM switch 358 or received by either of the workstations 360 and 362 from the workgroup ATM switch 358 may be processed in the workgroup ATM switch 358 in accordance with the cell swapping and table preparation described herein.

Thus, ATM switches with schedulers may populate schedule tables in accordance with the swapping operation and table preparation described herein. In doing so, the tables may dictate the timing of cell transmission. End users may thus send real-time data with constant bandwidth requirements such as voice or video data through ATM switches or other devices utilizing the cell swapping and table preparation described herein by way of ports in those devices configured for various constant bandwidth transmission rates. The bandwidth and timing requirements of the ports and ultimately of the end user data are furthermore met through the application of the swap operation to the population of tables in the schedulers.

While the systems, apparatuses, and methods of preparing a table for a cell scheduler have been described in detail and with reference to specific embodiments thereof, it will be apparent to one skilled in the art that various changes and modifications can be made therein without departing from the spirit and scope thereof. Thus, it is intended that the modifications and variations be covered provided they come within the scope of the appended claims and their equivalents.

What is claimed is:

1. A scheduler comprising:
    a memory device to store a table, the table to have a total number of N slots to store entries, with L of those slots already containing entries,
    wherein N is defined as an integer representing the total number of slots in the table, N further being expressible as a power of two with an integer exponent x, and
    wherein L is defined as an integer representing a number of slots that already contain entries; and
    a processor coupled to the memory device, the processor to derive an integer index value for a component of a sub-stream, the index value indicating a slot of the table into which an entry associated with the component of the sub-stream is to be placed, wherein the index value is derived by swapping x bits of a binary representation of the number of entries L already in the table.

2. The scheduler of claim 1, wherein the entry associated with a sub-stream is a first entry of a series of consecutive entries associated with consecutive components of the sub-stream, and wherein the processor is further to derive an index value for each of the consecutive entries following the first entry by adding a progressively incremented integer multiple, starting with a multiple of one, to the index value for each consecutive component, respectively.

3. The scheduler of claim 1, wherein the processor is to derive the index value by exchanging x bits of the binary representation of L around an axis located at one of (i) a center bit of the x bits of the binary representation of L when x is an odd number or (ii) between two center bits of the x bits of the binary representation of L when x is an even number.

4. The scheduler of claim 1, wherein the sub-stream includes constant bandwidth traffic associated with a port coupled to the processor.

5. The scheduler of claim 1, wherein the processor is further to place an identifier in the index that points to a component of the sub-stream stored in a second table.

6. An ATM switch comprising:
    a port coupled to a network and receiving a sub-stream therefrom, the sub-stream having a plurality of consecutive components;
    a memory device to store a table, the table to have a total number of N slots to store entries, with L of those slots already containing entries,
    wherein N is defined as an integer representing the total number of slots in the table, N further being expressible as a power of two with an integer exponent x, and
    wherein L is defined as an integer representing a number of slots that already contain entries; and
    a processor coupled to the memory device, the processor to derive an integer index value for a component of a sub-stream, the index value indicating a slot of the table into which an entry associated with the component of the sub-stream is to be placed, wherein the index value is derived by swapping x bits of a binary representation of the number of entries L already in the table.

7. The ATM switch of claim 6, wherein the sub-stream includes constant bandwidth traffic associated with the port.

8. The ATM switch of claim 6, wherein the processor is further to place an identifier in the index that points to a component of the sub-stream stored in a second table.

9. A method, comprising:
    establishing a data structure in a memory unit, the data structure having a total number of N slots for entries,
    wherein N is defined as an integer representing the total number of slots in the data structure, N further being expressible as a power of two with an integer exponent x;

storing entries into L slots of the data structure,
wherein L is defined as an integer representing a number of slots that already contain entries;
swapping x bits of a binary representation of L to produce an index value; and
storing a new entry into the data structure, the new entry being stored into an entry represented by the index value produced by said swapping.

10. The method of claim 9, wherein said swapping includes exchanging the x bits of the binary representation of L around an axis located at one of (i) a center at a middle bit of the x bits of the binary representation of L when x is an odd number or (ii) a center between two middle bits of the x bits of the binary representation of L when x is an even number.

11. The method of claim 10, wherein the middle bit is a bit of the x bits such that there is an equal number of the x bits on either side of the middle bit.

12. The method of claim 10, wherein the center between two middle bits is a position such that an equal number of the x bits lie on either side.

13. The method of claim 9, wherein the x bits range from two to the zero power to two to the x minus one power of the binary representation of L.

14. The method of claim 9, wherein said storing includes entering an identifier that serves as a pointer to a first component of a sub-stream in a slot corresponding to the value.

15. The method of claim 9, wherein the data structure includes a table in a scheduler.

16. The method of claim 15, wherein the table is a port shaper table.

17. The method of claim 9, wherein the entries are associated with components of at least one existing sub-stream and the new entry is associated with a first component of a new sub-stream.

18. The method of claim 17, wherein the new sub-stream has a series of consecutive components and the new entry is associated with the first component of the new sub-stream, the method further comprising deriving an index value for each consecutive component of the new sub-stream following the first component by adding a consecutive integer multiple of an integer value to the value obtained by swapping to identify a slot in the table for each consecutive entry of the new sub-stream.

19. The method of claim 18, wherein the new sub-stream includes constant bandwidth traffic associated with a particular port on a network device.

20. The method of claim 19, wherein the traffic includes real-time data traffic.

21. The method of claim 17, wherein the new sub-stream has the largest number of components for entry into the data structure of a plurality of new sub-streams.

22. The method of claim 17, wherein the first component of the new sub-stream includes an ATM cell.

23. The method of claim 17, wherein the first component of the new sub-stream is associated with a particular port on a network device.

24. The method of claim 9, further comprising:
transmitting information through a communication port in accordance with entries stored in the data structure.

* * * * *